US011682165B2

(12) United States Patent
Nonn et al.

(10) Patent No.: US 11,682,165 B2
(45) Date of Patent: Jun. 20, 2023

(54) METHODS AND SYSTEMS FOR AUGMENTING DEPTH DATA FROM A DEPTH SENSOR, SUCH AS WITH DATA FROM A MULTIVIEW CAMERA SYSTEM

(71) Applicant: Proprio, Inc., Seattle, WA (US)

(72) Inventors: Thomas Ivan Nonn, Kenmore, WA (US); David Julio Colmenares, Seattle, WA (US); James Andrew Youngquist, Seattle, WA (US)

(73) Assignee: Proprio, Inc., Seattle, WA (US)

( * ) Notice: Subject to any disclaimer, the term of this patent is extended or adjusted under 35 U.S.C. 154(b) by 0 days.

(21) Appl. No.: 17/154,670

(22) Filed: Jan. 21, 2021

(65) Prior Publication Data

US 2021/0225020 A1 Jul. 22, 2021

Related U.S. Application Data

(60) Provisional application No. 62/963,717, filed on Jan. 21, 2020.

(51) Int. Cl.
*G06T 17/00* (2006.01)
*G06T 7/557* (2017.01)
(Continued)

(52) U.S. Cl.
CPC .............. *G06T 17/00* (2013.01); *G06T 7/557* (2017.01); *G06T 17/20* (2013.01); *G06V 10/806* (2022.01);
(Continued)

(58) Field of Classification Search
CPC ................... G06T 7/557; G06T 17/20; G06T 2207/10052; G06T 2210/56;
(Continued)

(56) References Cited

U.S. PATENT DOCUMENTS 8,073,318 B2 12/2011 Gindele et al.
8,330,796 B2 * 12/2012 Schmidt ............... H04N 13/133
348/42

(Continued)

OTHER PUBLICATIONS

International Search Report and Written Opinion for International Application No. PCT/US2021/014397; dated Mar. 25, 2021; 14 pages.

(Continued)

*Primary Examiner* — Philip P. Dang
(74) *Attorney, Agent, or Firm* — Perkins Coie LLP

(57) ABSTRACT

Methods of determining the depth of a scene and associated systems are disclosed herein. In some embodiments, a method can include augmenting depth data of a scene captured with a depth sensor with depth data from one or more images of the scene. For example, the method can include capturing image data of the scene with a plurality of cameras. The method can further include generating a point cloud representative of the scene based on the depth data from the depth sensor and identifying a missing region of the point cloud, such as a region occluded from the view of the depth sensor. The method can then include generating depth data for the missing region based on the image data. Finally, the depth data for the missing region can be merged with the depth data from the depth sensor to generate a merged point cloud representative of the scene.

14 Claims, 10 Drawing Sheets

(51) Int. Cl.
    *G06T 17/20*     (2006.01)
    *H04N 13/282*     (2018.01)
    *G06V 10/80*     (2022.01)
    *G06V 20/20*     (2022.01)
    *G06V 20/64*     (2022.01)
    *H04N 13/00*     (2018.01)

(52) U.S. Cl.
    CPC ............ *G06V 20/20* (2022.01); *G06V 20/647* (2022.01); *H04N 13/282* (2018.05); *G06T 2207/10052* (2013.01); *G06T 2207/20104* (2013.01); *G06T 2210/41* (2013.01); *H04N 2013/0081* (2013.01)

(58) Field of Classification Search
    CPC ....... G06T 2207/20104; G06T 2210/41; G06T 2207/30008; G06T 2200/24; G06T 2207/10028; G06T 2207/20221; G06T 2207/30168; G06T 5/005; G06T 5/50; G06T 17/00; H04N 13/282; H04N 2013/0081; H04N 13/117; H04N 13/243; G06K 9/00208; G06K 9/00671; G06K 9/629

See application file for complete search history.

(56) References Cited

U.S. PATENT DOCUMENTS

| | | | | |
|---|---|---|---|---|
| 8,780,172 B2 * | 7/2014 | Girdzijauskas | ...... | H04N 13/243 348/42 |
| 9,191,646 B2 * | 11/2015 | Rusanovskyy | ...... | H04N 13/161 |
| 10,097,813 B2 * | 10/2018 | Stenger | ................ | H04N 13/128 |
| 10,121,064 B2 * | 11/2018 | Hong | .................... | G06T 7/0004 |
| 10,166,078 B2 * | 1/2019 | Sela | ...................... | A61B 5/0035 |
| 10,278,787 B2 * | 5/2019 | Sela | ...................... | A61B 46/10 |
| 10,357,317 B2 * | 7/2019 | Dupont | ...................... | A61B 5/055 |
| 10,395,418 B2 * | 8/2019 | Bronder | .................. | G06F 3/012 |
| 10,600,233 B2 * | 3/2020 | Lakshman | .............. | G06T 7/596 |
| 10,627,901 B2 * | 4/2020 | Raskar | ...................... | G06T 7/55 |
| 10,650,573 B2 | 5/2020 | Youngquist et al. | | |
| 10,832,429 B2 * | 11/2020 | Blasco Claret | ......... | G06T 7/557 |
| 11,045,257 B2 * | 6/2021 | Srimohanarajah | ..... | A61B 5/064 |
| 2017/0079724 A1 | 3/2017 | Yang et al. | | |
| 2017/0238998 A1 | 8/2017 | Srimohanarajah et al. | | |
| 2018/0225866 A1 | 8/2018 | Zhang et al. | | |
| 2019/0236796 A1 | 8/2019 | Blasco Claret et al. | | |
| 2020/0057778 A1 * | 2/2020 | Sun | ...................... | G06F 16/583 |

OTHER PUBLICATIONS

Examination Report No. 1 for Australian Application No. 2021211677; dated Mar. 28, 2023; 3 pages.

* cited by examiner

METHODS AND SYSTEMS FOR AUGMENTING DEPTH DATA FROM A DEPTH SENSOR, SUCH AS WITH DATA FROM A MULTIVIEW CAMERA SYSTEM

CROSS-REFERENCE TO RELATED APPLICATION(S)

This application claims the benefit of U.S. Provisional Patent Application No. 62/963,717, filed Jan. 21, 2020, and titled "METHODS AND SYSTEMS FOR AUGMENTING DEPTH DATA FROM A DEPTH SENSOR, SUCH AS WITH DATA FROM A MULTIVIEW CAMERA SYSTEM," which is incorporated herein by reference in its entirety.

TECHNICAL FIELD

The present technology generally relates to imaging systems, and more specifically, to imaging systems for generating a virtual perspective of a scene for a mediated-reality viewer.

BACKGROUND

In a mediated reality system, an image processing system adds, subtracts, and/or modifies visual information representing an environment. For surgical applications, a mediated reality system can enable a surgeon to view a surgical site from a desired perspective together with contextual information that assists the surgeon in more efficiently and precisely performing surgical tasks. Such mediated reality systems rely on image data from multiple camera angles and depth information about the environment to reconstruct an image of the environment.

Depth information about the environment is typically obtained via a dedicated depth sensor, such as a structured light depth sensor. However, the capture of complex three-dimensional geometries using a structured light depth sensor requires that all surfaces of the environment be exposed to the depth sensor to acquire error-free and complete data. In practice, this is not feasible due to geometries and/or occluded surfaces hidden from the depth sensor.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

DETAILED DESCRIPTION

Figure 1:
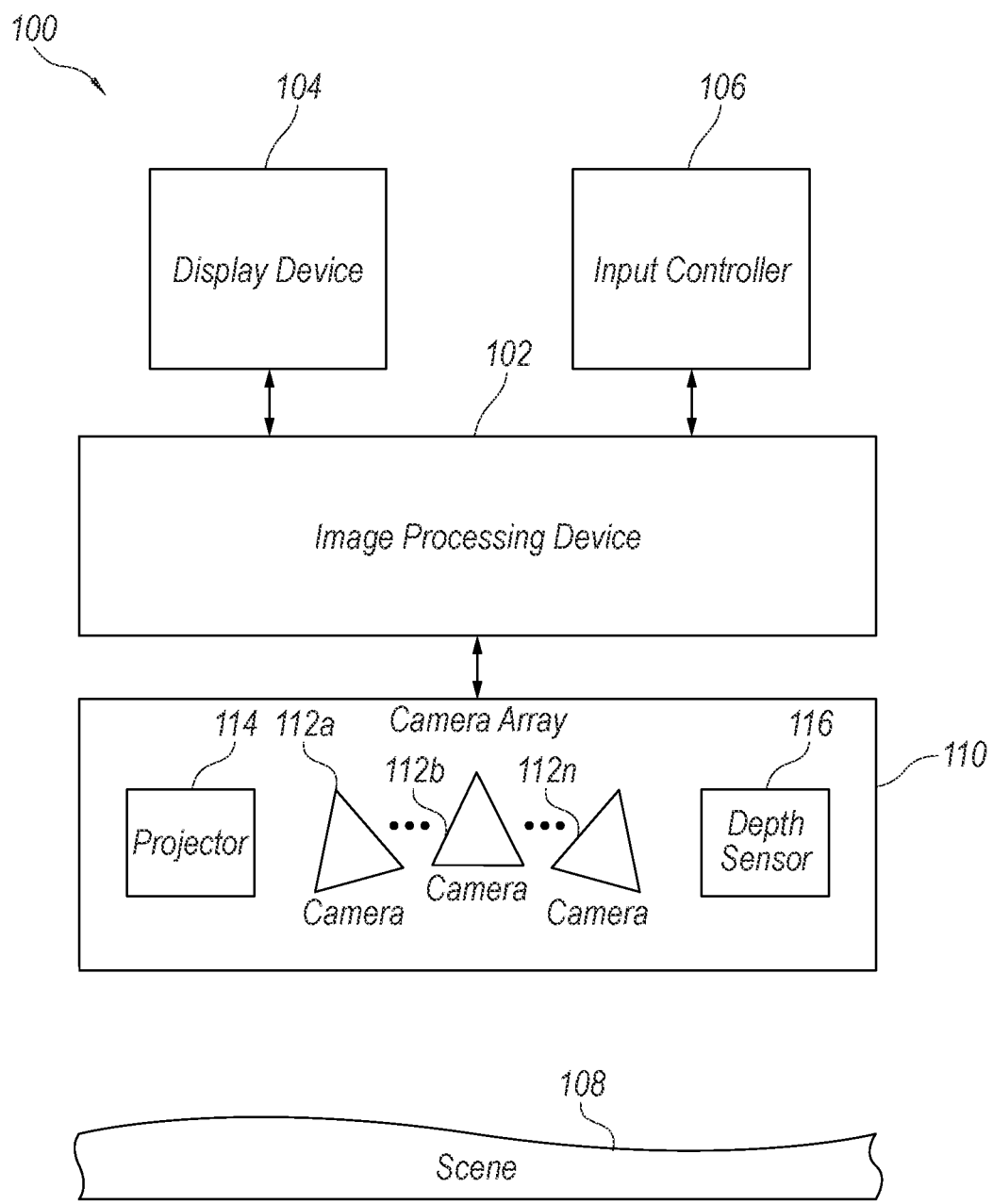
FIG. 1 is a schematic view of an imaging system configured in accordance with embodiments of the present technology.

Aspects of the present disclosure are directed generally to methods of determining the depth of a scene, such as surgical scene, and using the depth information to reconstruct a virtual camera perspective of the scene. In several of the embodiments described below, for example, a method includes augmenting depth data of the scene captured with a depth sensor with depth data from one or more images of the scene. For example, the method can include capturing (i) the depth data of the scene with the depth sensor and (ii) images of the scene with a plurality of cameras. The method can further include generating a point cloud representative of the scene based on the depth data from the depth sensor and identifying a missing region of the point cloud, such as a region occluded from the view of the depth sensor. The method can then include generating depth data for the missing region based on the images from the cameras. The images can be light field images containing information about the intensity of light rays emanating from the scene and also information about a direction the light rays are traveling through space. The method can further include merging (i) the depth data for the missing region derived from the images with (ii) the depth data from the depth sensor to generate a merged point cloud representative of the scene.

In one aspect of the present technology, the merged point cloud can have a greater accuracy and/or resolution than the point cloud generated from the depth data from the depth sensor alone. In another aspect of the present technology, depth information is determined quickly for as much of the scene as possible using a depth sensor, and light field processing is used only for the relatively small regions of the scene where depth information cannot be or cannot accurately be determined using the depth sensor (e.g., the missing regions). Accordingly, the present technology can provide real time or near real time depth and image processing while also providing improved accuracy. That is, the combined depth determination approach of the present technology can provide (i) improved latency compared to light field processing alone and (ii) improved accuracy compared to depth sensor processing alone.

Specific details of several embodiments of the present technology are described herein with reference to FIGS. 1-9C. The present technology, however, can be practiced without some of these specific details. In some instances, well-known structures and techniques often associated with camera arrays, light field cameras, image reconstruction, depth sensors, and the like have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

The headings provided herein are for convenience only and should not be construed as limiting the subject matter disclosed.

I. SELECTED EMBODIMENTS OF IMAGING SYSTEMS

FIG. 1 is a schematic view of an imaging system 100 ("system 100") configured in accordance with embodiments of the present technology. In the illustrated embodiment, the system 100 includes an image processing device 102 that is operably/communicatively coupled to one or more display devices 104, one or more input controllers 106, and a camera array 110. In other embodiments, the system 100 can comprise additional, fewer, or different components. In some embodiments, the system 100 can include features that are generally similar or identical to those of the mediated-reality imaging systems disclosed in U.S. patent application Ser. No. 16/586,375, titled "CAMERA ARRAY FOR A MEDIATED-REALITY SYSTEM," which is incorporated herein by reference in its entirety.

In the illustrated embodiment, the camera array 110 includes a plurality of cameras 112 (identified individually as cameras 112a-112n) that are each configured to capture images of a scene 108 from a different perspective. In some embodiments, the cameras 112 are positioned at fixed locations and orientations relative to one another. For example, the cameras 112 can be structurally secured by/to a mounting structure (e.g., a frame) at predefined fixed locations and orientations. In some embodiments, the cameras 112 can be positioned such that neighboring cameras share overlapping views of the scene 108. In some embodiments, the cameras 112 in the camera array 110 are synchronized to capture images of the scene 108 substantially simultaneously (e.g., within a threshold temporal error). In some embodiments, all or a subset of the cameras 112 can be light-field/plenoptic/ RGB cameras that are configured to capture information about the light field emanating from the scene 108 (e.g., information about the intensity of light rays in the scene 108 and also information about a direction the light rays are traveling through space).

In the illustrated embodiment, the camera array 110 further comprises (i) one or more projectors 114 configured to project a structured light pattern onto/into the scene 108, and (ii) one or more depth sensors 116 configured to estimate a depth of a surface in the scene 108. In some embodiments, the depth sensor 116 can estimate depth based on the structured light pattern emitted from the projector 114.

The image processing device 102 is configured to (i) receive images (e.g., light-field images, light field image data) captured by the camera array 110 and depth information from the depth sensor 116, and (ii) process the images and depth information to synthesize an output image corresponding to a virtual camera perspective. In the illustrated embodiment, the output image corresponds to an approximation of an image of the scene 108 that would be captured by a camera placed at an arbitrary position and orientation corresponding to the virtual camera perspective. More specifically, the depth information can be combined with the images from the cameras 112 to synthesize the output image as a three-dimensional rendering of the scene 108 as viewed from the virtual camera perspective. In some embodiments, the image processing device 102 can synthesize the output image using any of the methods disclosed in U.S. patent application Ser. No. 16/457,780, titled "SYNTHESIZING AN IMAGE FROM A VIRTUAL PERSPECTIVE USING PIXELS FROM A PHYSICAL IMAGER ARRAY WEIGHTED BASED ON DEPTH ERROR SENSITIVITY," which is incorporated herein by reference in its entirety.

The image processing device 102 can synthesize the output image from a subset (e.g., two or more) of the cameras 112 in the camera array 110, but does not necessarily utilize images from all of the cameras 112. For example, for a given virtual camera perspective, the image processing device 102 can select a stereoscopic pair of images from two of the cameras 112 that are positioned and oriented to most closely match the virtual camera perspective. In some embodiments, the image processing device 102 (and/or depth sensor 116) is configured to estimate a depth for each surface point of the scene 108 and to generate a point cloud and/or three-dimensional (3D) mesh that represents the surface of the scene 108. For example, in some embodiments the depth sensor 116 can detect the structured light projected onto the scene 108 by the projector 114 to estimate depth information of the scene 108. Alternatively or additionally, the image processing device 102 can perform the depth estimation based on depth information received from the depth sensor 116. As described in detail below, in some embodiments the image processing device 102 can estimate depth from multiview image data from the cameras 112 with or without utilizing information collected by the projector 114 or the depth sensor 116.

In some embodiments, functions attributed to the image processing device 102 can be practically implemented by two or more physical devices. For example, in some embodiments a synchronization controller (not shown) controls images displayed by the projector 114 and sends synchronization signals to the cameras 112 to ensure synchronization between the cameras 112 and the projector 114 to enable fast, multi-frame, multi-camera structured light scans. Additionally, such a synchronization controller can operate as a parameter server that stores hardware specific configurations such as parameters of the structured light scan, camera settings, and camera calibration data specific to the camera configuration of the camera array 110. The synchronization controller can be implemented in a separate physical device from a display controller that controls the display device 104, or the devices can be integrated together.

The image processing device 102 can comprise a processor and a non-transitory computer-readable storage medium that stores instructions that when executed by the processor, carry out the functions attributed to the image processing device 102 as described herein. Although not required, aspects and embodiments of the present technology can be described in the general context of computer-executable instructions, such as routines executed by a general-purpose computer, e.g., a server or personal computer. Those skilled in the relevant art will appreciate that the present technology can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The present technology can be embodied in a special purpose computer or data processor that is specifically programmed, configured or constructed to perform one or more of the computer-executable instructions explained in detail below. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines can be located in both local and remote memory storage devices. Aspects of the invention described below can be stored or distributed on computer-readable media, including magnetic and optically readable and removable computer discs, stored as in chips (e.g., EEPROM or flash memory chips). Alternatively, aspects of the invention can be distributed electronically over the Internet or over other networks (including wireless networks). Those skilled in the relevant art will recognize that portions of the present technology can reside on a server computer, while corresponding portions reside on a client computer. Data structures and transmission of data particular to aspects of the present technology are also encompassed within the scope of the invention.

The virtual camera perspective can be controlled by an input controller 106 that provides a control input corresponding to the location and orientation of the virtual camera perspective. The output images corresponding to the virtual camera perspective are outputted to the display device 104. The display device 104 is configured to receive output images (e.g., the synthesized three-dimensional rendering of the scene 108) and to display the output images for viewing by one or more viewers. The image processing device 102 can beneficially process received inputs from the input controller 106 and process the captured images from the camera array 110 to generate output images corresponding to the virtual perspective in substantially real-time as perceived by a viewer of the display device 104 (e.g., at least as fast as the frame rate of the camera array 110).

The display device 104 can comprise, for example, a head-mounted display device, a monitor, a computer display, and/or another display device. In some embodiments, the input controller 106 and the display device 104 are integrated into a head-mounted display device and the input controller 106 comprises a motion sensor that detects position and orientation of the head-mounted display device. The virtual camera perspective can then be derived to correspond to the position and orientation of the head-mounted display device 104 such that the virtual perspective corresponds to a perspective that would be seen by a viewer wearing the head-mounted display device 104. Thus, in such embodiments the head-mounted display device 104 can provide a real-time rendering of the scene 108 as it would be seen by an observer without the head-mounted display device 104. Alternatively, the input controller 106 can comprise a user-controlled control device (e.g., a mouse, pointing device, handheld controller, gesture recognition controller) that enables a viewer to manually control the virtual perspective displayed by the display device 104.

Figure 2:
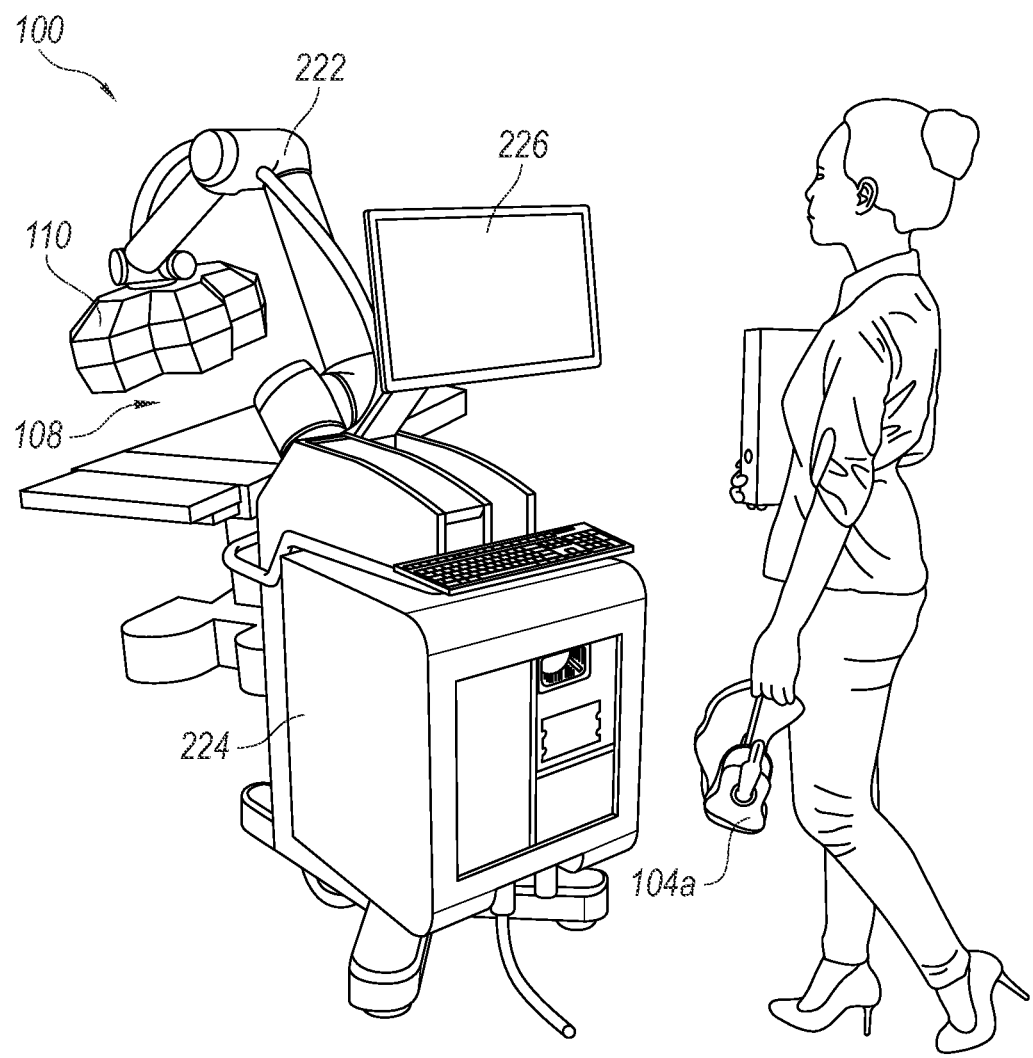
FIG. 2 is a perspective view of a surgical environment employing the imaging system of FIG. 1 for a surgical application in accordance with embodiments of the present technology.

FIG. 2 is a perspective view of a surgical environment employing the system 100 for a surgical application in accordance with embodiments of the present technology. In the illustrated embodiment, the camera array 110 is positioned over the scene 108 (e.g., a surgical site) and supported/positioned via a swing arm 222 that is operably coupled to a workstation 224. In some embodiments, the swing arm 222 can be manually moved to position the camera array 110 while, in other embodiments, the swing arm 222 can be robotically controlled in response to the input controller 106 (FIG. 1) and/or another controller. In the illustrated embodiment, the display device 104 is embodied as a head-mounted display device (e.g., a virtual reality headset, augmented reality headset). The workstation 224 can include a computer to control various functions of the image processing device 102, the display device 104, the input controller 106, the camera array 110, and/or other components of the system 100 shown in FIG. 1. Accordingly, in some embodiments the image processing device 102 and the input controller 106 are each integrated in the workstation 224. In some embodiments, the workstation 224 includes a secondary display 226 that can display a user interface for performing various configuration functions, a mirrored image of the display on the display device 104, and/or other useful visual images/indications.

II. SELECTED EMBODIMENTS OF AUGMENTING DEPTH DATA FROM A DEPTH SENSOR

Figure 3:
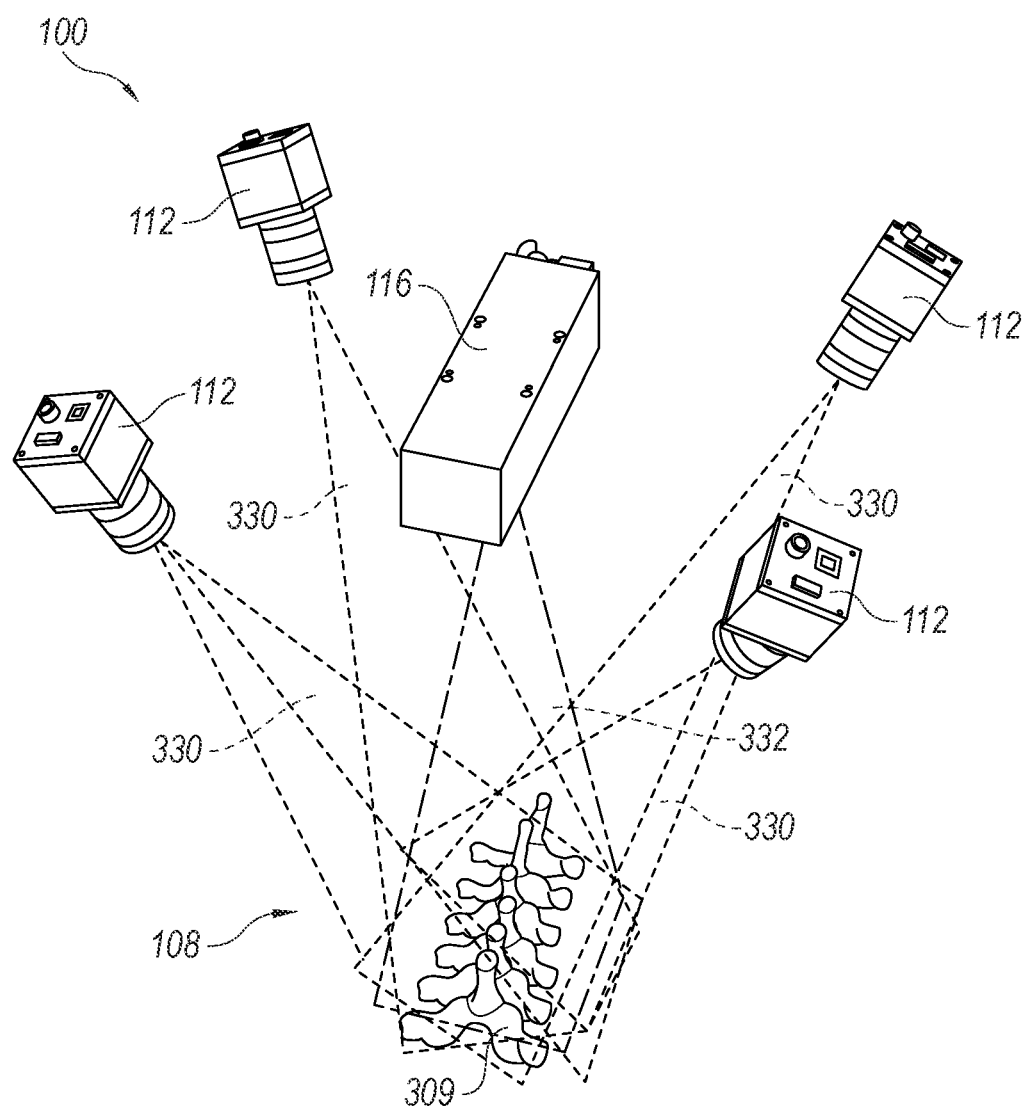
FIG. 3 is an isometric view of a portion of the imaging system including a depth sensor and multiple cameras configured in accordance with embodiments of the present technology.

FIG. 3 is an isometric view of a portion of the system 100 illustrating four of the cameras 112 and the depth sensor 116 in accordance with embodiments of the present technology. Other components of the system 100 (e.g., other portions of the camera array 110, the image processing device 102, etc.) are not shown in FIG. 3 for the sake of clarity. In the illustrated embodiment, each of the cameras 112 has a field of view 330 and is oriented such that the field of view 330 is aligned with a portion of the scene 108. Likewise, the depth sensor 116 can have a field of view 332 aligned with a portion of the scene 108. In some embodiments, a portion of some or all of the field of views 330, 332 can overlap.

In the illustrated embodiment, a portion of a spine 309 of a patient (e.g., a human patient) is located in/at the scene 108. Often, the spine 309 (or other surfaces located in the scene 108) will have a complex 3D geometry such that is difficult to accurately determine the depth of its surfaces, and therefore difficult to accurately model with a point cloud, 3D mesh, and/or other mathematical representation. For example, if a portion of the surface of the scene 108 (e.g., a portion of the spine 309) is occluded from the field of view 332 of the depth sensor 116, the depth sensor 116 will be unable to determine the depth of the occluded region. Likewise, it can be difficult to accurately determine the depth along steep surfaces of the scene 108. More specifically, for a structured light system to recover depth at a given location the structured light projector (e.g., the projector 114) must illuminate that location with a pixel or block of pixels of structured illumination. Also, the imagers (e.g., the depth sensor 116) measuring the projection must have a pixel/block that sees that illumination. Both conditions must be met to make a measurement of the location. In practice, it is typically not possible to achieve a fill rate of 100%—where every pixel of depth has a valid value. This is because real scenes have complex geometries that cause occlusion of the projector, the imagers/sensors, or both. Accordingly, if the system 100 uses only the depth sensor 116 to determine depth, a depth model generated by the system 100 can have missing regions (e.g., holes) corresponding to the portions (e.g., surfaces) of the scene 108 where depth information is unavailable.

Figure 4:
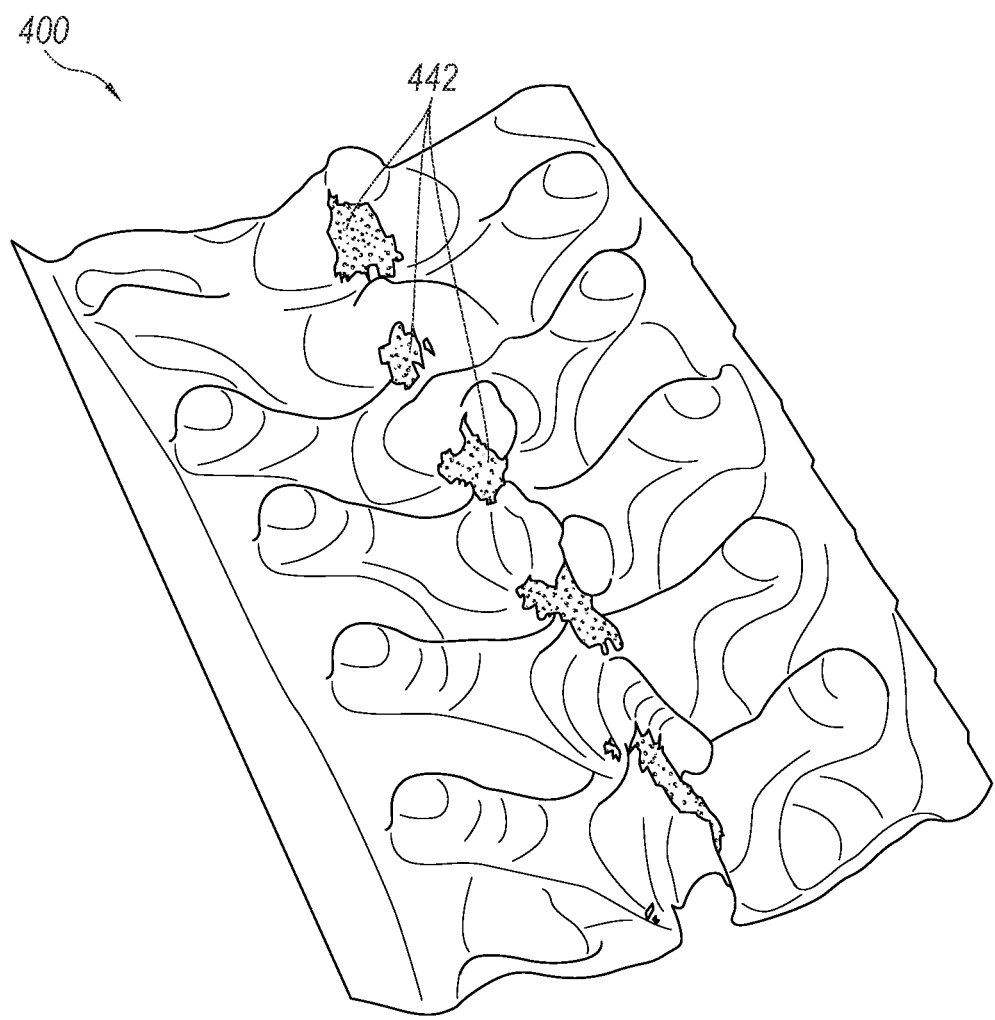
FIG. 4 is a schematic view of a point cloud generated by the imaging system in accordance with embodiments of the present technology.

In some embodiments, the system 100 is unable to adequately generate—or unable to accurately generate—an output image of the scene 108 for such portions of the scene 108 that have inadequate and/or inaccurate depth information. FIG. 4, for example, is a schematic view of a point cloud 440 generated by the depth sensor 116 of the system 100 for the surfaces of the spine 309 shown in FIG. 3 in accordance with embodiments of the present technology. Referring to FIGS. 1-4 together, the point cloud 440 generally comprises a plurality (e.g., hundreds, thousands, millions, or more) of data points corresponding to a distance of the surfaces of the spine 309 and/or other features in the scene 108 relative to the sensor 116 (e.g., the depth of the spinal surfaces). The point cloud 440 therefore maps/represents the 3D surface of the spine 309 and can be used by the image processing device 102 to synthesize the images from the cameras 112 into the output image of the scene 108 rendered from any desired virtual perspective, as described in detail above. In the illustrated embodiment, the point cloud 440 includes one or more missing regions 442 corresponding to portions (e.g., surfaces) of the scene 108 where depth information is inadequate and/or not reliable (e.g., regions where the depth sensor 116 is occluded). Accordingly, the system 100 may not be able to render an accurate output image for those portions of the scene 108.

Figure 5:
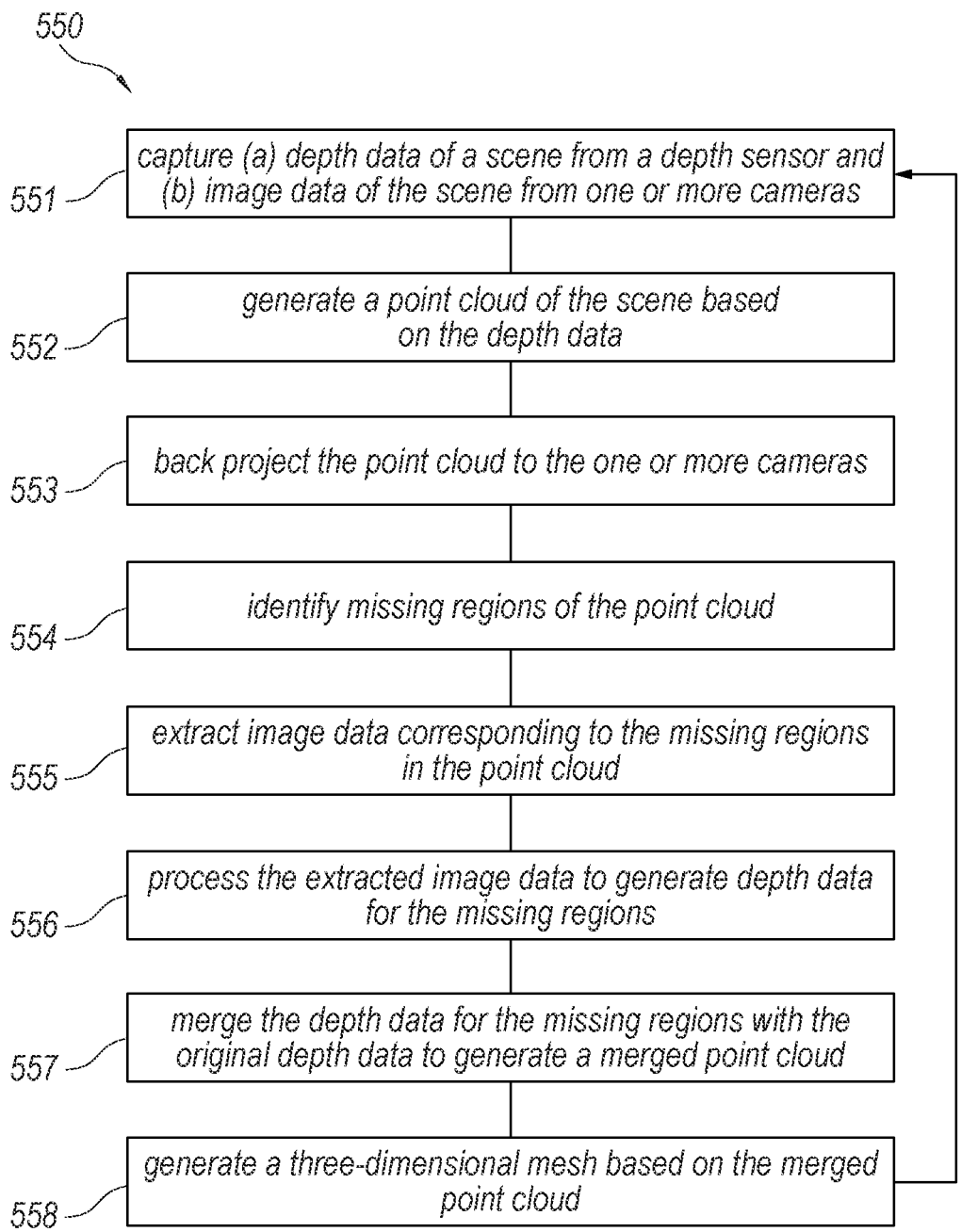
FIG. 5 is a flow diagram of a process or method for augmenting depth data captured with the depth sensor using image data captured by the cameras in accordance with embodiments of the present technology.

In some embodiments, the image processing device 102 can process image data from one or more of the cameras 112 to determine the depth of the spinal surfaces at one or more of the locations where depth information from the depth sensor 116 is inadequate, unreliable, and/or inaccurate. That is, the image data from the cameras 112 can be used to "fill in" the missing regions 442 of the point cloud 440. More specifically, FIG. 5 is a flow diagram of a process or method 550 for augmenting depth data captured with the depth sensor 116 using image data captured by the cameras 112 in accordance with embodiments of the present technology. Although some features of the method 550 are described in the context of the embodiments shown in FIGS. 1-4 for the sake of illustration, one skilled in the art will readily understand that the method 550 can be carried out using other suitable systems and/or devices described herein.

At block 551, the method 550 includes (a) capturing depth data of the scene 108 (e.g., of the spine 309) from the depth sensor 116 and (b) image data of the scene from one or more of the cameras 112. The depth data can include, for example, data about a structured light pattern projected onto/into the scene 108 (e.g., from the projector 114). The image data can be light field data including data about the intensity of light rays emanating from the scene 108 and also information about a direction the light rays are traveling. In some embodiments, the depth sensor 116 and the cameras 112 can capture the depth data and the image data simultaneously or substantially simultaneously and/or in real time or near real time. In other embodiments, the depth data can be captured before the image data.

At block 552, the method 550 includes generating a point cloud of the scene 108, such as the point cloud 440, based on the depth data from the depth sensor 116. In some embodiments, the image processing device 102 can receive the depth data from the depth sensor 116 and generate the point cloud based on the depth data. In some embodiments, the method 550 can further include generating a 3D mesh instead of or in addition to a point cloud. In other embodiments, at block 552 the method 550 can include generating other mathematical representations of the physical geometry of the scene 108.

At block 553, the method 550 includes back projecting the point cloud and/or depth data associated with the point cloud to individual ones of the cameras 112 and/or to the image processing device 102. Back projecting the point cloud to the cameras 112 allows an image of the scene 108 to be reconstructed. More specifically, back projection correlates a 2D pixel location in the images from the cameras 112 with a 3D position from the point cloud. By back projecting the point cloud to each of the images from the cameras 112, each pixel in the images can be associated with a 3D point—or not if the 3D position cannot be determined for the reasons discussed in detail above. An even simpler classifier is to label each pixel in the 2D image as having a valid 3D correspondence or not. In some embodiments, this classification can be used to create a binary mask for each of the cameras 112 that indicates which pixels have a valid 3D point.

At block 554, the method 550 includes identifying regions of missing data in the point cloud. For example, the method 550 can include identifying the missing regions 442 of the point cloud 440 where depth data is missing or incomplete. In some embodiments, identifying the missing data can include filtering the point cloud data and searching for holes that are greater than a predetermined threshold (e.g., a user-specified threshold) using, for example, an inverse Eulerian approach. In some embodiments, identifying missing data can include scanning the point cloud to determine regions with sparse or non-existent points. In some embodiments, a mesh can be generated for the point cloud (e.g., at block 552), and holes can be identified in the mesh using, for example, a method that identifies triangles in the mesh having at least one edge that is not shared by another triangle. In yet other embodiments, the missing regions 442 can be identified by searching for regions of the images from the cameras 112 where no valid 3D correspondence exists (e.g., by examining the binary mask for each image). In some embodiments, blocks 553 and 554 can be executed using the same algorithm and/or as part of the same computational process.

In some embodiments, at block 554, the method 550 can additionally or alternatively include identifying regions of invalid depth data, low confidence depth data, and/or other potentially problematic regions of the point cloud. For example, the depth sensor 116 can be configured to tag the depth data it captures with validation or confidence levels, and the method 550 can include identifying regions of the point cloud and/or mesh with validation or confidence levels that are below a predetermined threshold (e.g., a user-specified threshold). Such invalid or low confidence regions can be regions of the point cloud or mesh having discontinuities, sparse depth data, badly behaved normal values, and the like. In some embodiments, the method 550 may not identify single missing pixels as missing or invalid regions, and/or conversely may identify as missing/invalid regions of missing pixels with some "valid" pixels interspersed.

In some embodiments, at block 554, the method 550 can further include determining depth data for areas surrounding the missing regions 442 of the point cloud. This surrounding depth data can help inform/predict the depth of the missing regions 442 if it is assumed that there are not large discontinuities between the missing regions 442 and the surrounding areas, such that the missing depth values can be expected to be close to the surrounding depths.

At block 555, the method 550 includes extracting/identifying image data corresponding to the missing or invalid regions of the point cloud or mesh. For example, the image processing device 102 can determine which of the cameras 112 have their field of view 330 aligned with the region of the scene 108 that corresponds to the missing region. In some embodiments, the image processing device 102 can make this determination based on a priori information about (i) the positions and orientations of the cameras (and thus the extent of their fields of view 330), (ii) the back projection of the depth data to the cameras 112 (block 553), (iii) processing of the point cloud or mesh, and/or (iv) other data. Moreover, in some embodiments the system 100 can identify and extract image data from only those of the cameras 112 that are determined to have adequate optical coverage of the missing regions. In some embodiments, at least some of the cameras 112 can have at least partially overlapping fields of view 330 such that it is very likely that at least one of the cameras 112 has a field of view 330 aligned with the region of the scene 108 that corresponds to the missing region—even when other ones of the cameras 112 are occluded. Accordingly, in one aspect of the present technology the system 100 is configured to robustly capture image data about the missing regions even where substantial occlusions exist in the scene 108. In some embodiments, blocks 553-555 can be executed using the same algorithm and/or as part of the same computational process.

At block 556, the method 550 includes processing the extracted image data to generate depth data for the missing or invalid regions. For example, the image processing device 102 can generate depth data for the missing regions using the disparity from the cameras 112 that have the missing regions within their field of view 330 (e.g., that are facing the missing regions). In other embodiments, other suitable image processing techniques (e.g., computational algorithms) for determining depth from light field data can be used. In some embodiments, determining depth by processing the image data from the cameras 112 can be more computationally expensive (e.g., slower) than determining depth using the depth sensor 116 because of the complex nature of computational algorithms for processing depth information from light field data. As a result, image data from less than all of the cameras 112 may be used to generate depth data for the missing or invalid regions. In some embodiments, depth information about the areas surrounding the missing or invalid regions (e.g., captured at block 554) can be used to accelerate processing of the extracted image data. Specifically, many depth processing algorithms iterate through depths to search for the true values. Accordingly, by limiting the depth range based on the depth of the surrounding areas, a smaller range of depths, disparities, planes, and so on have to be searched through. Thus, the search can avoid local minima that may exist outside this expected region/range—accelerating processing.

Figure 6:
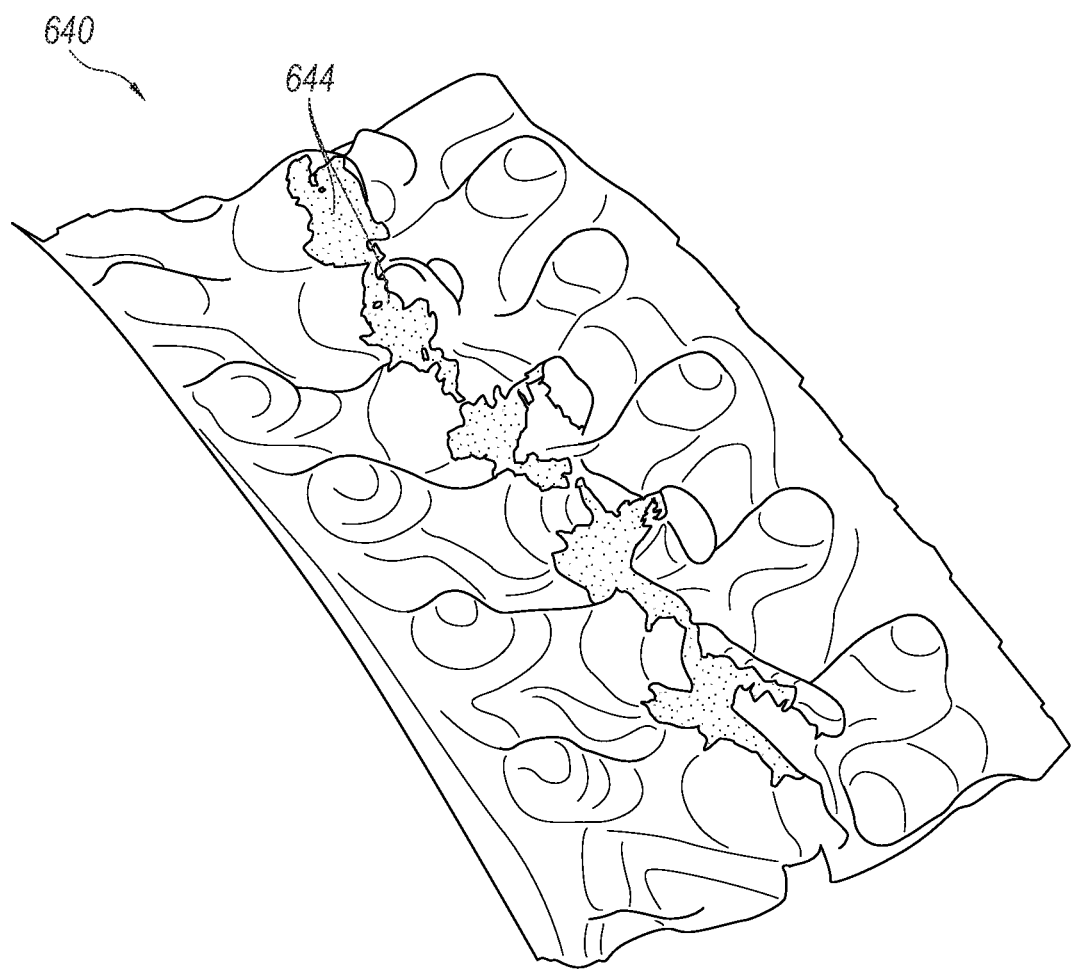
FIG. 6 is a schematic view of a merged point cloud in which depth data has been filled in for missing regions of the point cloud of FIG. 4 in accordance with embodiments of the present technology.

At block 557, the method 550 includes merging/fusing the depth data for the missing or invalid regions with the original depth data (e.g., captured at block 551) to generate a merged point cloud. FIG. 6, for example, is a schematic view of a merged point cloud 640 in which image-based depth data 644 has been filled into the missing regions 442 of the point cloud 440 shown in FIG. 4 in accordance with embodiments of the present technology. Accordingly, the merged point cloud 640 can provide a more accurate and robust depth map of the scene 108 that facilitates better reconstruction and synthesis of an output image of the scene 108 rendered from any desired virtual perspective, as described in detail above.

At block 558, the method 550 can optionally include generating a three-dimensional mesh based on the merged point cloud. The 3D mesh can be used to reconstruct/synthesize the output image of the scene 108. In some embodiments, the method 550 can return to block 551 to update the depth information of the scene 108. In some embodiments, the method 550 can proceed to back project the merged point cloud to the cameras 112 (block 553).

As noted above, determining depth by processing light field image data can be more computationally expensive than determining depth using a depth sensor. Indeed, if depth information for an entire scene were determined entirely through light field image processing, it would be difficult/impracticable to render output images in real time or near real-time because even very fast systems cannot measure and process the significant volume of data fast enough. However, in one aspect of the present technology depth information is determined quickly for as much of the scene as possible using a depth sensor, and light field processing is used only for the relatively small regions of the scene where there is inadequate and/or unreliable depth information from the depth sensor. Accordingly, the present technology can provide real time or near real time depth and image processing while also providing improved accuracy. That is, the combined depth determination approach of the present technology can provide (i) improved latency compared to light field processing alone and (ii) improved accuracy and resolution compared to depth sensor processing alone.

Figure 7:
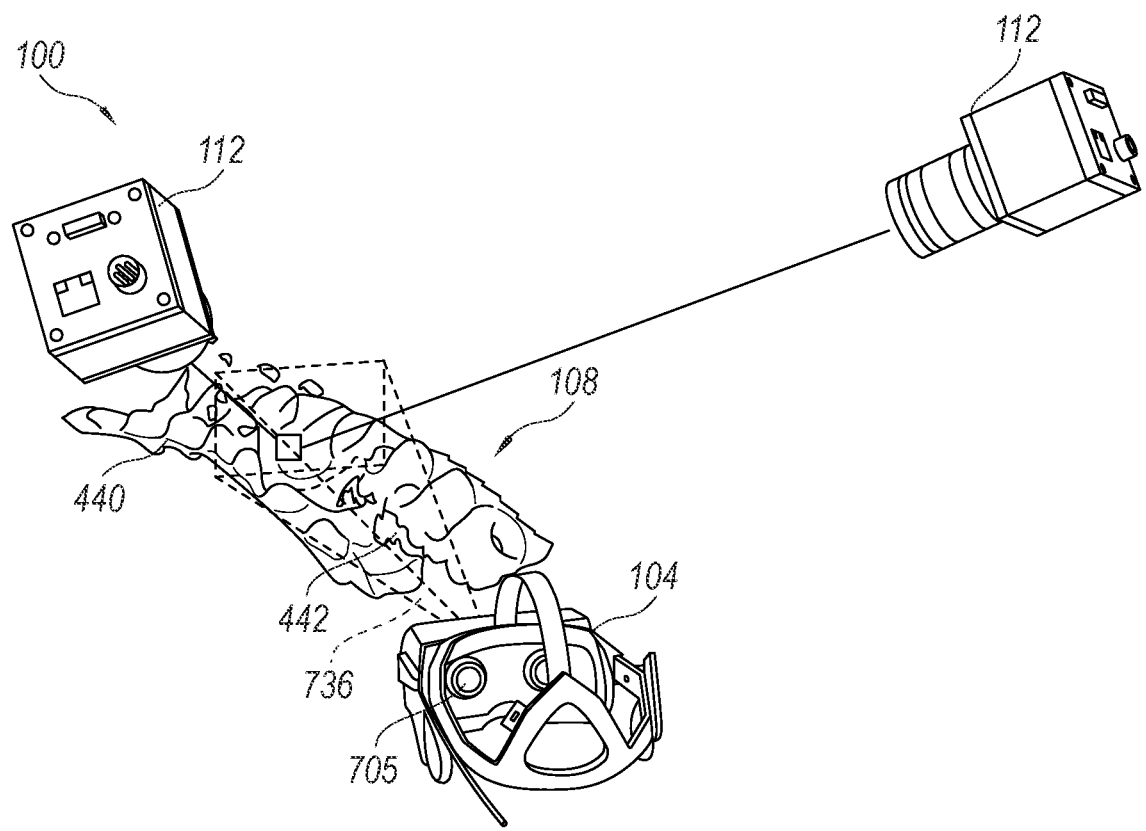
FIG. 7 is an isometric view of a portion of the imaging system configured in accordance with embodiments of the present technology.

In some embodiments, the latency of the system 100 can be further improved by updating the depth information only for missing or invalid regions of the point cloud for which increased accuracy is desired. For example, FIG. 7 is an isometric view of a portion of the system 100 illustrating two of the cameras 112, the display device 104, and the generated point cloud 440 (FIG. 4) in accordance with embodiments of the present technology. Other components of the system 100 (e.g., other portions of the camera array 110, the image processing device 102, etc.) are not shown in FIG. 7 for the sake of clarity.

In the illustrated embodiment, the display device 104 is a head-mounted display device 104 (e.g., a headset) configured to be worn by a user (e.g., a surgeon) and having a field of view 736 that is aligned with only a portion of the scene 108 (e.g., a portion of the spine 309 shown in FIG. 3). The head-mounted display device 104 can include a display 705 configured to display the rendered output image of the scene 108 to the user. The display 705 can be opaque or partially transparent. In some embodiments, the field of view 736 of the head-mounted display device 104 corresponds to a foveated region that represents the relatively narrow field of view that the eyes of the user can perceive.

The system 100 (e.g., the image processing device 102) can track the position and orientation of the field of view 736 relative to the scene 108 and can employ the method 550 (FIG. 5) to update only the missing regions 442 of the point cloud 440 that are within the field of view 736—without updating regions outside of the field of view 736. In some embodiments, the system 100 can identify the cameras 112 that have the best optical coverage of the portion of the scene 108 within the field of view 736. When the user changes the position and/or orientation of the head-mounted display device 104—and thus the field of view 736—the system 100 can seamlessly update (e.g., fill-in) the missing regions 442 that are within the field of view 736 in real time or near real time. In one aspect of the present technology, the latency of the image presented to the user via the head-mounted display device 104 is decreased because the missing regions 442 that are outside the foveated region of the user are not updated.

Referring again to FIG. 1, in some embodiments the cameras 112 can have a higher resolution than the depth sensor 116 such that more depth detail of the scene 108 can be extracted from the cameras 112 than from the depth sensor 116. Accordingly, even where depth information from the depth sensor 116 exists and is at least adequate to determine the general depth of the scene 108, it can be advantageous to also include image data from the cameras 112 to increase the depth resolution and, correspondingly, the resolution of the image output to the user via the display device 104. Therefore, in some embodiments the system 100 can process image data for particular local regions of the scene 108 to supplement or replace the depth data captured by the depth sensor 116 for those local regions. In some embodiments, a background process running on the image processing device 102 can update the local regions of the scene 108 automatically if, for example, the depth data from the depth sensor 116 is of poor quality in those regions. In other embodiments, the user can select certain areas in which to improve the resolution. In yet other embodiments, the system 100 can improve the resolution by processing light field data corresponding to all or a portion of the foveated region 736 of the user as shown in FIG. 7.

Figure 8:
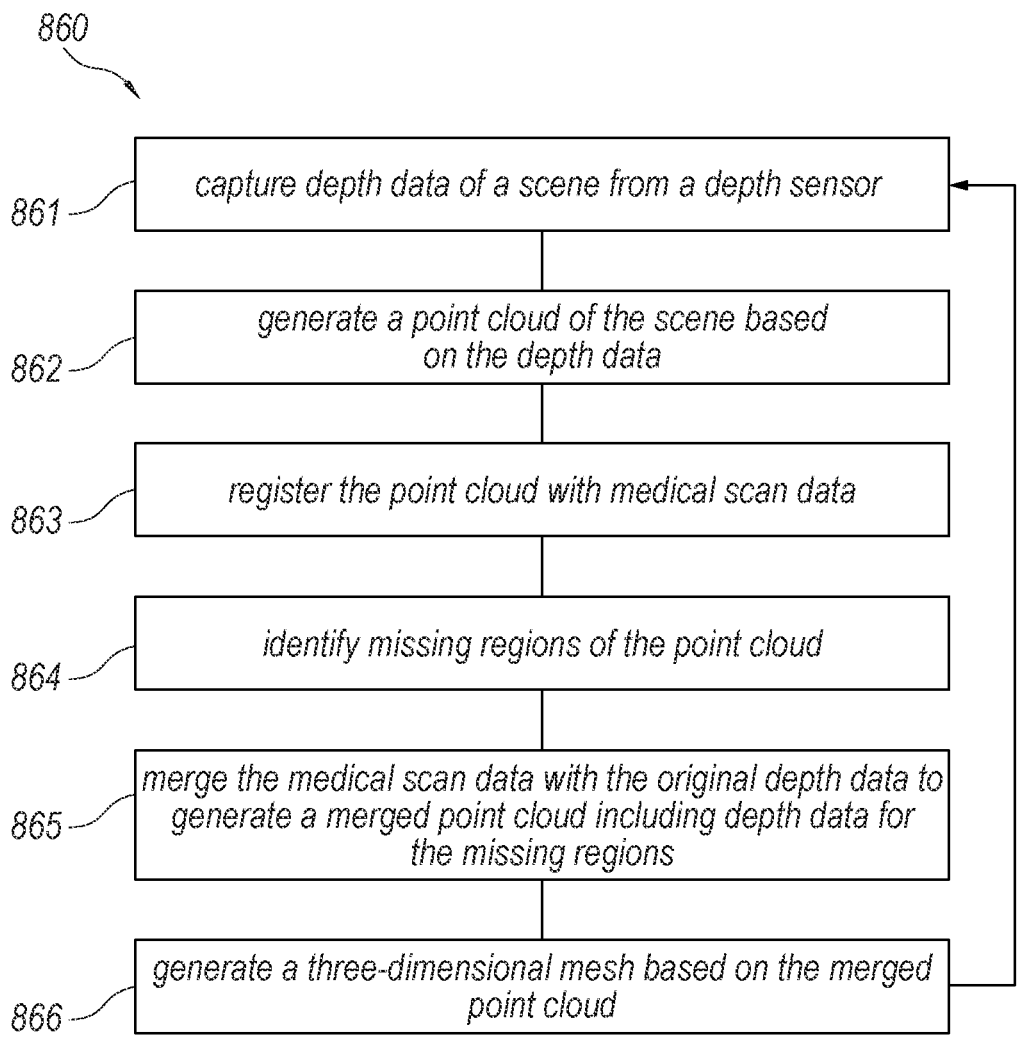
FIG. 8 is a flow diagram of a process or method for augmenting depth data captured with the depth sensor with depth data from a medical scan of a patient in accordance with embodiments of the present technology.

In other embodiments, depth data captured by the depth sensor 116 can be supplemented or replaced with depth information obtained from means other than processing image data from the cameras 112. For example, FIG. 8 is a flow diagram of a process or method 860 for augmenting depth data captured with the depth sensor 116 with depth data from one or more medical scans of a patient in accordance with embodiments of the present technology. Although some features of the method 860 are described in the context of the system 100 shown in FIG. 1 for the sake of illustration, one skilled in the art will readily understand that the method 860 can be carried out using other suitable systems and/or devices described herein. Moreover, while the method 860 is described in the context of augmenting depth data of the anatomy of a patient with medical scans of the patient, the method 860 can be practiced to update/augment depth data for other scenes and/or based on other data from other imaging/scanning techniques.

At block 861, the method 860 includes capturing depth data of the scene 108 (e.g., live data) from the depth sensor 116, such as data about a structured light pattern projected onto/into the scene 108. The scene 108 can include, for example, a portion of a patient undergoing surgery. As one example, the portion of the patient can be a portion of the patient's spine exposed during spinal surgery. Block 862 of the method 860 can proceed generally similarly or identically to block 552 of the method 550 of FIG. 5 to, for example, generate a point cloud representation of the depth of the scene 108.

At block 863, the method 860 includes registering the point cloud with medical scan data (e.g., patient data). In some embodiments, the medical scan can be a computerized tomography (CT) scan of the patient's spine that provides a complete 3D data set for at least a portion of the scene 108. The registration process matches points in the point cloud to corresponding 3D points in the medical scan. The system 100 can register the point cloud to the medical scan data by detecting positions of fiducial markers and/or feature points visible in both data sets. For example, where the volumetric data comprises CT data, rigid bodies of bone surface calculated from the CT data can be registered to the corresponding points/surfaces of the point cloud. In other embodiments, the system 100 can employ other registration processes based on other methods of shape correspondence, and/or registration processes that do not rely on fiducial markers (e.g., markerless registration processes). In some embodiments, the registration/alignment process can include features that are generally similar or identical to the registration/alignment processes disclosed in U.S. Provisional Patent Application No. 62/796,065, titled "ALIGNING PRE-OPERATIVE SCAN IMAGES TO REAL-TIME OPERATIVE IMAGES FOR A MEDIATED-REALITY VIEW OF A SURGICAL SITE," filed Jan. 23, 2019, which is incorporated herein by reference in its entirety, and which is attached hereto as Appendix A.

Figure 9A:
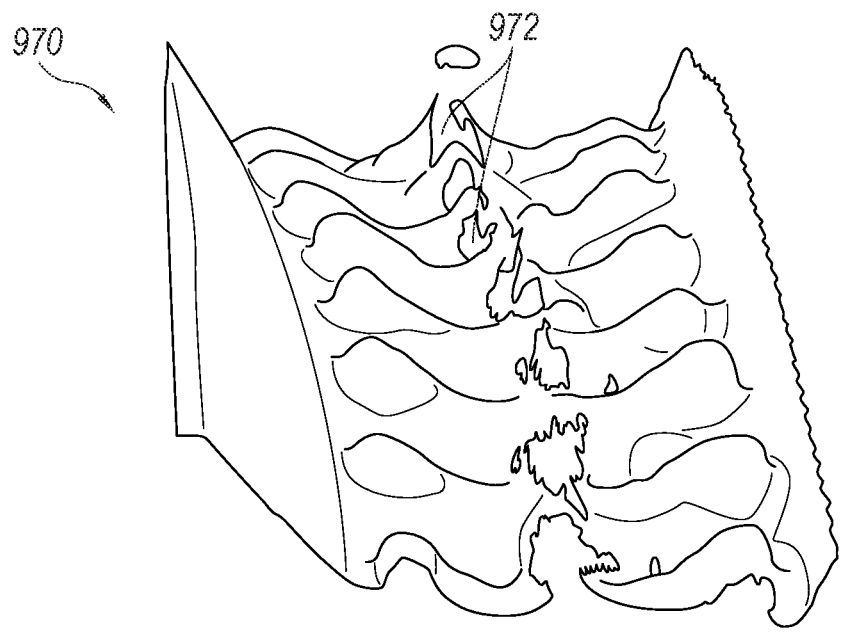
FIG. 9A is a schematic view of a point cloud generated by the imaging system in accordance with embodiments of the present technology.
Figure 9B:
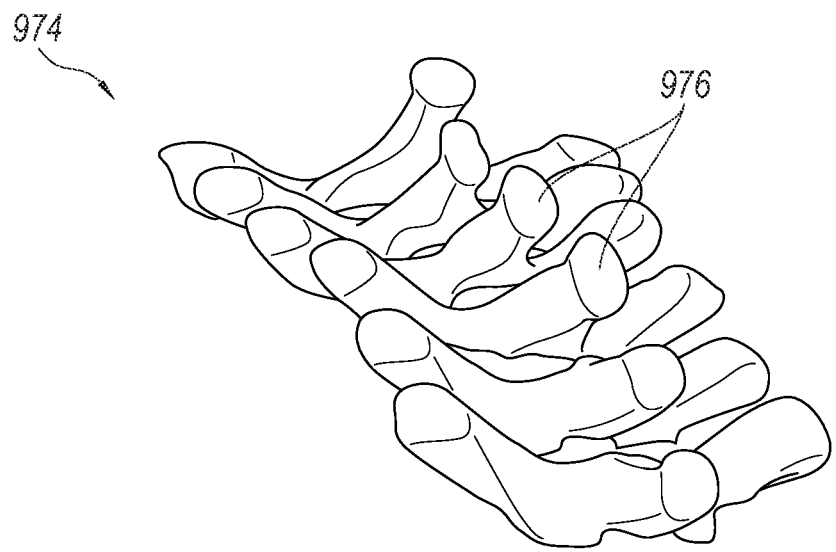
FIG. 9B is a schematic view of CT scan data corresponding to the point cloud of FIG. 9A in accordance with embodiments of the present technology.

At block 864, the method 860 includes identifying missing/invalid regions of the point cloud. In some embodiments, block 864 can proceed generally similarly or identically to block 554 of the method 550 of FIG. 5. In one aspect of the present technology, the medical scan data includes 3D depth data corresponding to the missing or invalid regions of the point cloud. For example, FIG. 9A is a schematic view of a point cloud 970 corresponding to a portion of a patient's spine and including missing regions 972. FIG. 9B is a schematic view of corresponding CT scan data 974 of the patient's spine in accordance with embodiments of the present technology. Referring to FIGS. 9A and 9B together, the CT scan data 974 can include 3D volumetric depth data 976 corresponding to at least a portion of the missing regions 972 in the point cloud 970.

At block 865, the method 860 includes merging/fusing the 3D data of the medical scan with the original depth data (e.g., captured at block 861) to generate a merged point cloud that includes data points for the missing or invalid regions. In general, the medical scan data can replace and/or supplement the data in the point cloud. For example, the medical scan data can replace data in regions of the point cloud where captured data is poor, and supplement (e.g., fill in) the missing regions of the point cloud. Accordingly, the merged point cloud can provide a more accurate and robust depth map of the scene 108 that facilitates better reconstruction and synthesis of an output image of the scene 108 rendered from any desired virtual perspective, as described in detail above.

Figure 9C:
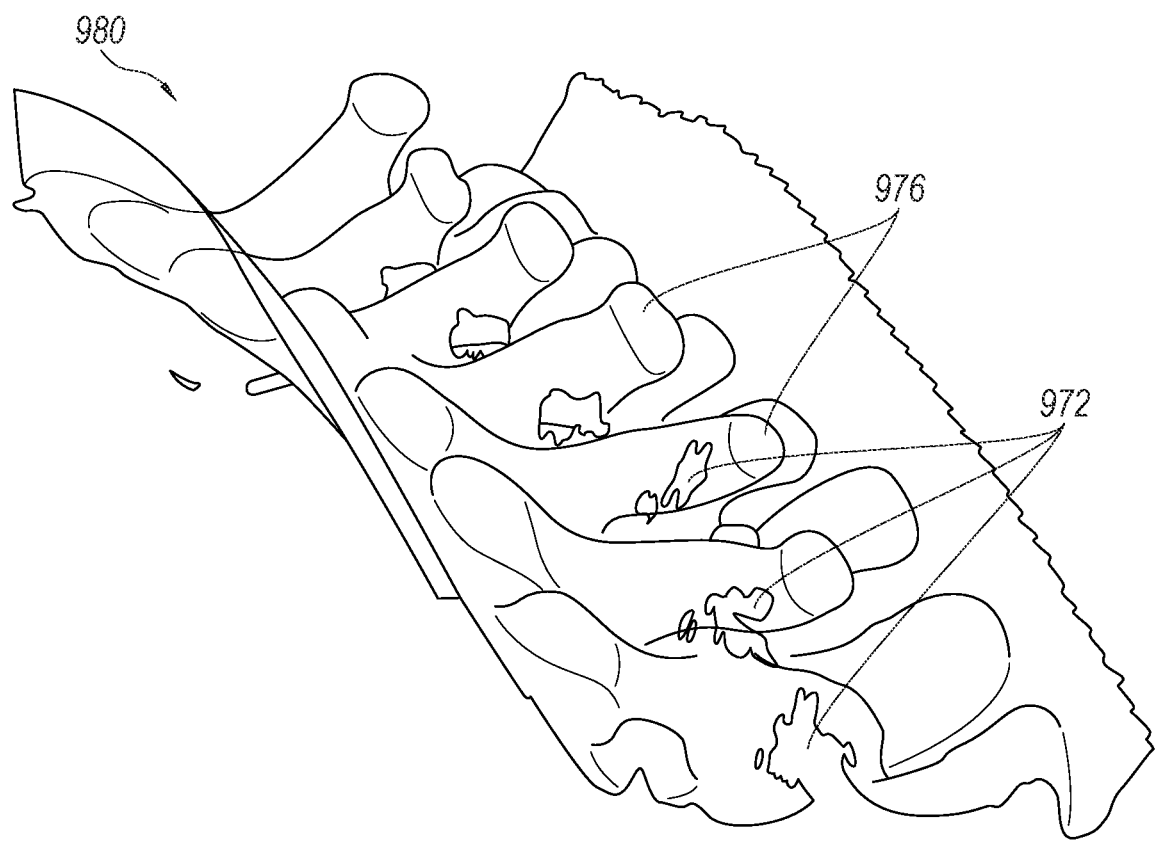
FIG. 9C is a schematic view of a merged point cloud in which the CT scan data shown in FIG. 9B has been merged with the point cloud shown in FIG. 9A in accordance with embodiments of the present technology.

More specifically, in some embodiments data from the medical scan is filled-in only for the missing regions of the point cloud. FIG. 9C, for example, is a schematic view of a merged point cloud 980 in which the CT scan data 974 shown in FIG. 9B has been filled in for the missing regions 972 of the point cloud 970 shown in FIG. 9A. In some embodiments, the appropriate regions of the CT scan data 974 corresponding to the missing regions 972 of the point cloud 970 can be found by comparing nearest neighbors between the registered CT scan data 974 and the point cloud 970. That is, for example, points in the medical scan that have no neighbor (e.g., are below a threshold) in the registered point cloud can be identified for merger into/with the point cloud data. In other embodiments, as much of the original depth data (e.g., the point cloud 970) as possible can be replaced with the registered medical scan data (e.g., the CT scan data 974). In some embodiments, a nearest neighbors algorithm can be used to determine which regions of the original depth data to remove and replace. In yet other embodiments, the medical scan data and the point cloud can be directly merged with a volumetric (e.g., voxel) representation, such as a truncated signed distance function (TSDF).

At block 866, the method 860 can optionally include generating a three-dimensional mesh based on the merged point cloud. The 3D mesh can be used to reconstruct/synthesize the output image of the scene 108. In some embodiments, the method 860 can return to block 851 to update the depth information of the scene 108. In some embodiments, when the medical scan data and original depth data are directly merged using a TSDF, the 3D mesh can be generated using a marching cubes or other suitable algorithm.

In some embodiments, the medical scan data is known a priori and thus does not require significant processing. Accordingly, in one aspect of the present technology the method 860 can quickly update (e.g., supplement and/or replace) the original depth based on the medical scan—allowing real time or near real time processing and generation of an output image of the scene 108.

In other embodiments, the medical scan data can act as an initial state for a depth optimization process, where further refinement is possible. For example, the medical scan data can be registered to the live data to fill-in holes as described in detail with reference to FIGS. 8-9C. However, in some embodiments the cameras 112 can have a higher resolution/accuracy than the medical scan data. Accordingly, the merged depth information from the depth sensor 116 and the medical scan data can be used to initialize a 3D reconstruction process using images from the cameras 112. The depth information from the images can then be merged with or replace the depth information from the medical scan. In some embodiments, the depth processing of the image data is accelerated because a depth range for the missing/invalid regions is known based on the medical scan data—thus minimizing the range of iterations needed to determine true depth values from the image data.

III. FURTHER EXAMPLES

The following examples are illustrative of several embodiments of the present technology:

1. A method of determining the depth of a scene, the method comprising:
   capturing depth data of the scene with a depth sensor;
   capturing image data of the scene with a plurality of cameras;
   generating a point cloud representative of the scene based on the depth data;
   identifying a region of the point cloud;
   generating depth data for the region based on the image data; and
   merging the depth data for the region with the depth data from the depth sensor to generate a merged point cloud representative of the scene.

2. The method of example 1 wherein the region of the point cloud is a missing region of the point cloud in which the point cloud includes no data or sparse data.

3. The method of example 2 wherein identifying the missing region of the point cloud includes determining that the missing region of the point cloud has fewer than a predetermined threshold number of data points.

4. The method of example 2 or example 3 wherein identifying the missing region of the point cloud includes identifying a hole in the point cloud that is larger than a user-defined threshold.

5. The method of any one of examples 2-4 wherein generating the depth data for the missing region is further based on a portion of the depth data captured by the depth sensor that surrounds the missing region.

6. The method of any one of examples 1-5 wherein the depth data for the region has a greater resolution than the depth data captured with the depth sensor.

7. The method of any one of examples 1-6 wherein the method further comprises generating a three-dimensional mesh representative of the scene based on the merged point cloud.

8. The method of any one of examples 1-7 wherein the scene is a surgical scene.

9. The method of any one of examples 1-8 wherein the plurality of cameras each have a different position and orientation relative to the scene, and wherein the image data is light field image data.

10. The method of any one of examples 1-9 wherein the method further comprises:
    processing the image data and the merged point cloud to synthesize an output image of the scene corresponding to a virtual camera perspective; and
    transmitting the output image to the display for display to a user.

11. The method of example 10 wherein the display is a head-mounted display worn by the user, and wherein identifying the region of the scene is based on at least one of a position and an orientation of the head-mounted display.

12. A system for imaging a scene, comprising:
    multiple cameras arranged at different positions and orientations relative to the scene and configured to capture image data of the scene;
    a depth sensor configured to capture depth data about a depth of the scene; and
    a computing device communicatively coupled to the cameras and the depth sensor, wherein the computing device has a memory containing computer-executable instructions and a processor for executing the computer-executable instructions contained in the memory, and wherein the computer-executable instructions include instructions for—
    receiving the image data from the cameras;
    receiving the depth data from the depth sensor;
    generating a point cloud representative of the scene based on the depth data;
    identifying a region of the point cloud;
    generating depth data for the region based on the image data; and
    merging the depth data for the region with the depth data from the depth sensor to generate a merged point cloud representative of the scene.

13. The system of example 12 wherein the region of the point cloud is a missing region of the point cloud in which the point cloud includes no data or sparse data.

14. The system of example 12 or example 13 wherein the region of the point cloud is user-selected.

15. The system of any one of examples 12-14, further comprising a display, wherein the computing device is communicatively coupled to the display, and wherein the computer-executable instructions further include instructions for—
processing the image data and the merged point cloud to synthesize an output image of the scene corresponding to a virtual camera perspective; and
transmitting the output image to the display for display to a user.

16. The system of example 15 wherein identifying the region of the scene is based on at least one of a position and an orientation of the display.

17. A method of determining the depth of a scene, the method comprising:
capturing depth data of the scene with a depth sensor;
generating a point cloud representative of the scene based on the depth data;
identifying a region of the point cloud;
registering the point cloud with three-dimensional (3D) medical scan data; and
merging at least a portion of the 3D medical scan data with the depth data from the depth sensor to generate a merged point cloud representative of the scene.

18. The method of example 17 wherein the region of the point cloud is a missing region of the point cloud in which the point cloud includes no data or sparse data.

19. The method of example 18 wherein the scene is a medical scene including a portion of a patient, wherein the missing region of the point cloud corresponds to the portion of the patient, and wherein the portion of the 3D medical scan data portion corresponds to the same portion of the patient.

20. The method of any one of examples 17-19 wherein the 3D medical scan data is a computed tomography (CT) data.

IV. CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments can perform steps in a different order. The various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

We claim:

1. A method of generating an output image of a portion of a scene, wherein the output image is from a perspective of a virtual camera having a field of view corresponding to the portion of the scene, the method comprising:
capturing depth data of the scene with a depth sensor;
capturing light field image data of the scene with a plurality of cameras, wherein the plurality of cameras each have a different position and orientation relative to the scene;
generating a point cloud representative of the scene based on the depth data;
identifying a missing region of the point cloud within the field of view of the virtual camera in which the point cloud includes no data or sparse data, wherein identifying the missing region of the point cloud includes determining that the missing region of the point cloud has fewer than a predetermined threshold number of data points;
generating depth data for the missing region based on the light field image data;
merging the depth data for the missing region with the depth data from the depth sensor to generate a merged point cloud representative of the scene;
processing the light field image data and the merged point cloud to synthesize the output image of the portion scene from the perspective of the virtual camera; and
transmitting the output image to a display for display to a user.

2. The method of claim 1 wherein identifying the missing region of the point cloud includes identifying a hole in the point cloud that is larger than a user-defined threshold.

3. The method of claim 1 wherein generating the depth data for the missing region is further based on a portion of the depth data captured by the depth sensor that surrounds the missing region.

4. The method of claim 1 wherein the depth data for the missing region has a greater resolution than the depth data captured with the depth sensor.

5. The method of claim 1 wherein the method further comprises generating a three-dimensional mesh representative of the portion of the scene based on the merged point cloud.

6. The method of claim 1 wherein the scene is a surgical scene.

7. The method of claim 1 wherein the display is a head-mounted display worn by the user, and wherein the method further comprises determining the perspective of the virtual camera based on at least one of a position and an orientation of the head-mounted display.

8. A system for imaging a scene, comprising:
multiple cameras arranged at different positions and orientations relative to the scene and configured to capture light field image data of the scene;
a depth sensor configured to capture depth data about a depth of the scene; and
a computing device communicatively coupled to the cameras and the depth sensor, wherein the computing device has a memory containing computer-executable instructions and a processor for executing the computer-executable instructions contained in the memory, wherein the computer-executable instructions include instructions for generating an output image of a portion of the scene, wherein the output image is from a perspective of a virtual camera having a field of view corresponding to the portion of the scene, and wherein generating the output image comprises:

receiving the light field image data from the cameras;

receiving the depth data from the depth sensor;

generating a point cloud representative of the scene based on the depth data;

identifying a missing region of the point cloud within the field of view of the virtual camera in which the point cloud includes no data or sparse data, wherein identifying the missing region of the point cloud includes determining that the missing region of the point cloud has fewer than a predetermined threshold number of data points;

generating depth data for the missing region based on the light field image data;

merging the depth data for the missing region with the depth data from the depth sensor to generate a merged point cloud representative of the scene;

processing the light field image data and the merged point cloud to synthesize the output image of the portion scene from the perspective of the virtual camera; and transmitting the output image to a display for display to a user.

9. The system of claim 8 wherein the missing region of the point cloud is user-selected.

10. The system of claim 8, further comprising the display, wherein the computing device is communicatively coupled to the display.

11. The system of claim 10 wherein identifying the missing region of the scene is based on at least one of a position and an orientation of the display.

12. A method of generating an output image of a portion of a scene, wherein the output image is from a perspective of a virtual camera having a field of view corresponding to the portion of the scene, the method comprising:

capturing depth data of the scene with a depth sensor;

generating a point cloud representative of the scene based on the depth data;

identifying a missing region of the point cloud within the field of view of the virtual camera in which the point cloud includes no data or sparse data, wherein identifying the missing region of the point cloud includes determining that the missing region of the point cloud has fewer than a predetermined threshold number of data points;

registering the point cloud with three-dimensional (3D) medical scan data; and merging at least a portion of the 3D medical scan data with the depth data from the depth sensor to generate a merged point cloud representative of the scene;

wherein the method further comprises:

capturing light field image data of the scene with a plurality of cameras, wherein the plurality of cameras each have a different position and orientation relative to the scene;

processing the light field image data and the merged point cloud to synthesize the output image of the portion scene from the perspective of the virtual camera; and transmitting the output image to a display for display to a user.

13. The method of claim 12 wherein the scene is a medical scene including a portion of a patient, wherein the missing region of the point cloud corresponds to the portion of the patient, and wherein the portion of the 3D medical scan data portion corresponds to the same portion of the patient.

14. The method of claim 12 wherein the 3D medical scan data is computed tomography (CT) data.

* * * * *